(12) United States Patent
Nakamura

(10) Patent No.: US 6,366,366 B1
(45) Date of Patent: Apr. 2, 2002

(54) IMAGE READING METHOD AND APPARATUS

(75) Inventor: Youichi Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/137,109

(22) Filed: Aug. 20, 1998

(30) Foreign Application Priority Data

Aug. 22, 1997 (JP) .............................................. 9-226111

(51) Int. Cl.[7] .................................................. H04N 1/04
(52) U.S. Cl. ........................................ 358/487; 358/506
(58) Field of Search ................................ 358/474, 475, 358/487, 506, 484, 505; 382/312

(56) References Cited

U.S. PATENT DOCUMENTS

| | | | | |
|---|---|---|---|---|
| 5,666,578 A | * | 9/1997 | Oikawa ....................... 396/319 |
| 5,706,050 A | * | 1/1998 | Nishimura et al. ............. 348/97 |
| 5,729,284 A | * | 3/1998 | Ishii .............................. 348/96 |
| 5,745,218 A | * | 4/1998 | Sugahare ....................... 355/40 |
| 5,754,221 A | * | 5/1998 | Nishimura et al. ............. 348/97 |
| 5,850,253 A | * | 12/1998 | Inoue ........................... 348/96 |
| 5,992,743 A | * | 11/1999 | Suemoto et al. .......... 235/462.05 |
| 6,046,765 A | * | 4/2000 | Nishimura et al. ............. 348/96 |

FOREIGN PATENT DOCUMENTS

JP 408084291 A * 3/1996 .......... H04N/5/253

* cited by examiner

Primary Examiner—Jerome Grant, II

(57) ABSTRACT

An image reading method and apparatus are provided to make it possible to reduce the time required for reading of a film image, and to reduce wear of a magnetic head and damage to a film which are caused by conveying of the film. There are provided a reading device which reads film images sequentially recorded on an elongated photographic film, a magnetically recorded data reading device which reads magnetically recorded data magnetically recorded on the photographic film, a conveying device for conveying the photographic film, and control device for controlling the reading device to carry out the preliminary reading of each of film images recorded on the photographic film while controlling the conveying device to convey the photographic film in a predetermined direction, and for controlling the magnetically recorded data reading device to read the first magnetically recorded date concurrently with the preliminary reading of the film images by the reading means.

13 Claims, 11 Drawing Sheets

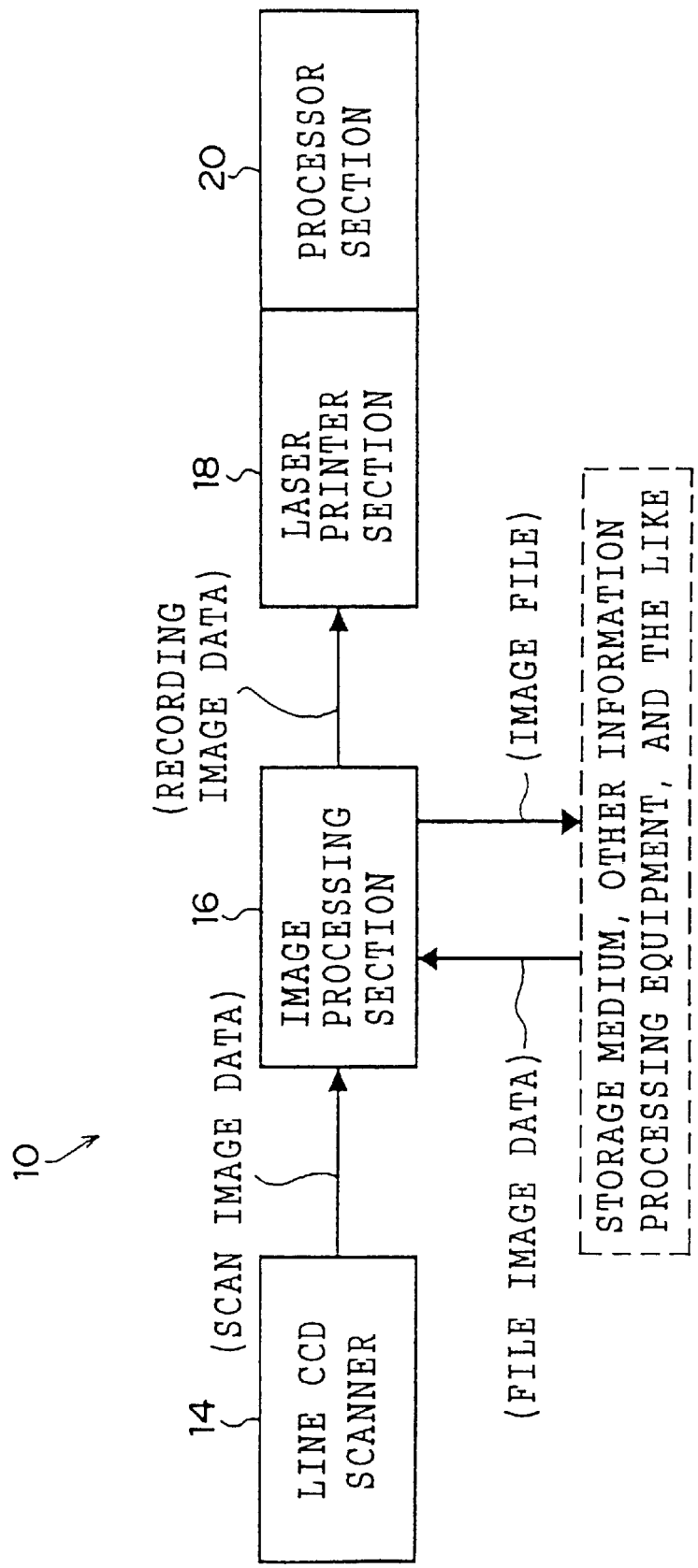

F I G. 1 1
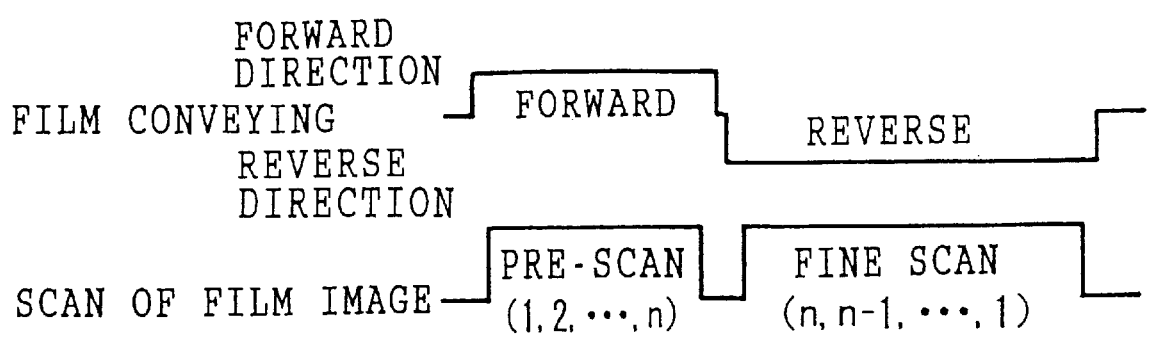

IMAGE READING METHOD AND APPARATUS

BACKGROUND OF THE INVENTION

1. Field of the Invention

The present invention relates to an image reading method and apparatus, and particularly to an image reading method and apparatus in which preliminary reading of an image is carried out, and based on the results of the preliminary reading, a reading condition for the main reading of the image is determined, and further, the main reading for the image is carried out under the determined reading condition.

2. Description of the Related Art

There has conventionally been known an image processing system in which a film image recorded on a photographic film is read by an image reading apparatus having a reading sensor such as a CCD, and image data obtained by the reading of the film image is subjected to image processing including various types of correction and the like, and thereafter, an image is recorded onto a recording material or shown on a display.

Further, as the film image, there exist images which have various densities ranging from low density to high density. Accordingly, in order to obtain a recorded or a displayed image having a desired image quality, the image reading apparatus carried out a preliminary reading of a film image (so-called pre-scan), determines a reading condition corresponding to a density of the film image (for example, the amount of light irradiated on the film image, the charge accumulation time of a CCD, or the like), and further, reads the film image under the determined reading condition (so-called fine scan).

When a scanner having a unidimensional reading sensor such as a line CCD is used as the reading means of an image reading apparatus to read film images, reading of a film image, i.e., pre-scan and fine scan, is carried out while a photographic film is being conveyed in a direction perpendicular to the optical axis of the optical system of the scanner at a predetermined speed.

Example of the photographic film to be read by the image reading apparatus are 135-size films, 240-size films, Brownie-size films, and the like. Among these films, 240-size films (which will be hereinafter referred to as APS films) have a magnetic layer formed thereon, and data which expresses photographing conditions (for example, photographing time, whether an electric flash was used, the amount of exposure during photographing, and the like) for each frame is magnetically recorded on the magnetic layer at the time of photographing. The magnetically recorded data which is magnetically recorded on the magnetic layer is necessary for calculation of the reading condition for fine scan and of the processing condition for image processing of the image data obtained by the fine scan.

Accordingly, when a film image recorded on the APS film is read, reading of the magnetically recorded data which is magnetically recorded on the magnetic layer must be carried out in addition to pre-scan and fine scan, and thus, one roll of APS film must be conveyed at least three times. Accordingly, there exists a drawback in that much time is required for reading of the film image and the processing capacity of the apparatus thereby deteriorates.

Further, the APS film set in the scanner is conveyed in a state of constantly contacting a magnetic head for reading the magnetically recorded data, which magnetic head is disposed close to a film conveying path of a film carrier for conveying the APS film. As described above, in the case of the APS film, the film is conveyed during reading of the film image, and therefore, wear of the magnetic head occurs at an early stage and the life duration of the magnetic head is shortened. There also exists a drawback in that the APS film conveyed in the state of contacting the magnetic head is apt to be damaged.

SUMMARY OF THE INVENTION

In view of the above-described circumstances, it is an object of the present invention to provide an image reading method and apparatus which can reduce the time required for reading of a film image and can reduce wear of a magnetic head for reading magnetically recorded data and damage to a film.

When a film image is read by a scanner having a line CCD sensor or the like, a film conveying speed suitable for pre-scan is, for example, 150 to 250 mm/second and a film conveying speed suitable for fine scan is, for example, 36 mm/second. Further, it is desired that a film be conveyed at a speed of 100 mm/second or more for stable reading of magnetically recorded data from the magnetic layer of the APS film.

The present inventors achieved the present invention by having come to the conclusion that, in consideration of the film conveying speeds suitable for pre-scan, reading of magnetically recorded data, and fine scan, pre-scan and reading of magnetically recorded data can be effected concurrently at the same conveying speed (for example, 150 to 200 mm/second), and preliminary reading of a film image and reading of magnetically recorded data can be effected concurrently during one film conveying operation, so as to reduce the number of film conveying operations.

According to the first aspect of the present invention, there is provided an image reading apparatus in which preliminary reading is carried out for a film image recorded on an elongated photographic film, and a main reading condition for main reading of the film image is determined based on results of the preliminary reading, and main reading of the film image is carried out under the main reading condition, comprising reading device which reads the film image recorded on the photographic film, magnetically recorded data reading device which reads first magnetically recorded data which is magnetically recorded on a magnetic recording layer of the photographic film, conveying device which conveys the photographic film and control device for controlling the reading device to carry out the preliminary reading of each of film images recorded on the photographic film while controlling the conveying device to convey the photographic film in a predetermined direction, and for controlling the magnetically recorded data reading device to read the first magnetically recorded date concurrently with the preliminary reading of the film images by the reading device.

According to the second aspect of the present invention, there is provided an image reading apparatus in which the film images sequentially recorded on the elongated photographic film are read by the scanner using line image sensor.

According to each of the first and second aspects of the present invention, the preliminary reading of a film image and the reading of magnetically recorded data are effected concurrently during one film conveying operation, and therefore, the number of times the film must be conveyed in order to read of the film image can be reduced and the time required for reading of the film image can be shortened. Further, wear of a magnetic head for reading magnetically recorded data and damage to the film, which are caused by the conveying of the film, can be lessened.

BRIEF DESCRIPTION OF THE DRAWINGS

FIG. 1 is a schematic block diagram of a digital laboratory system according to an embodiment of the present invention.

FIG. 11 is a timing chart which shows an example of a sequence in which a photographic film is conveyed and a film image is read.

DESCRIPTION OF THE PREFERRED EMBODIMENTS

Referring now to the attached drawings, an embodiment of the present invention will be hereinafter described in detail. First, a description will be given of a digital laboratory system according to the embodiment of the present invention.

Figure 2:
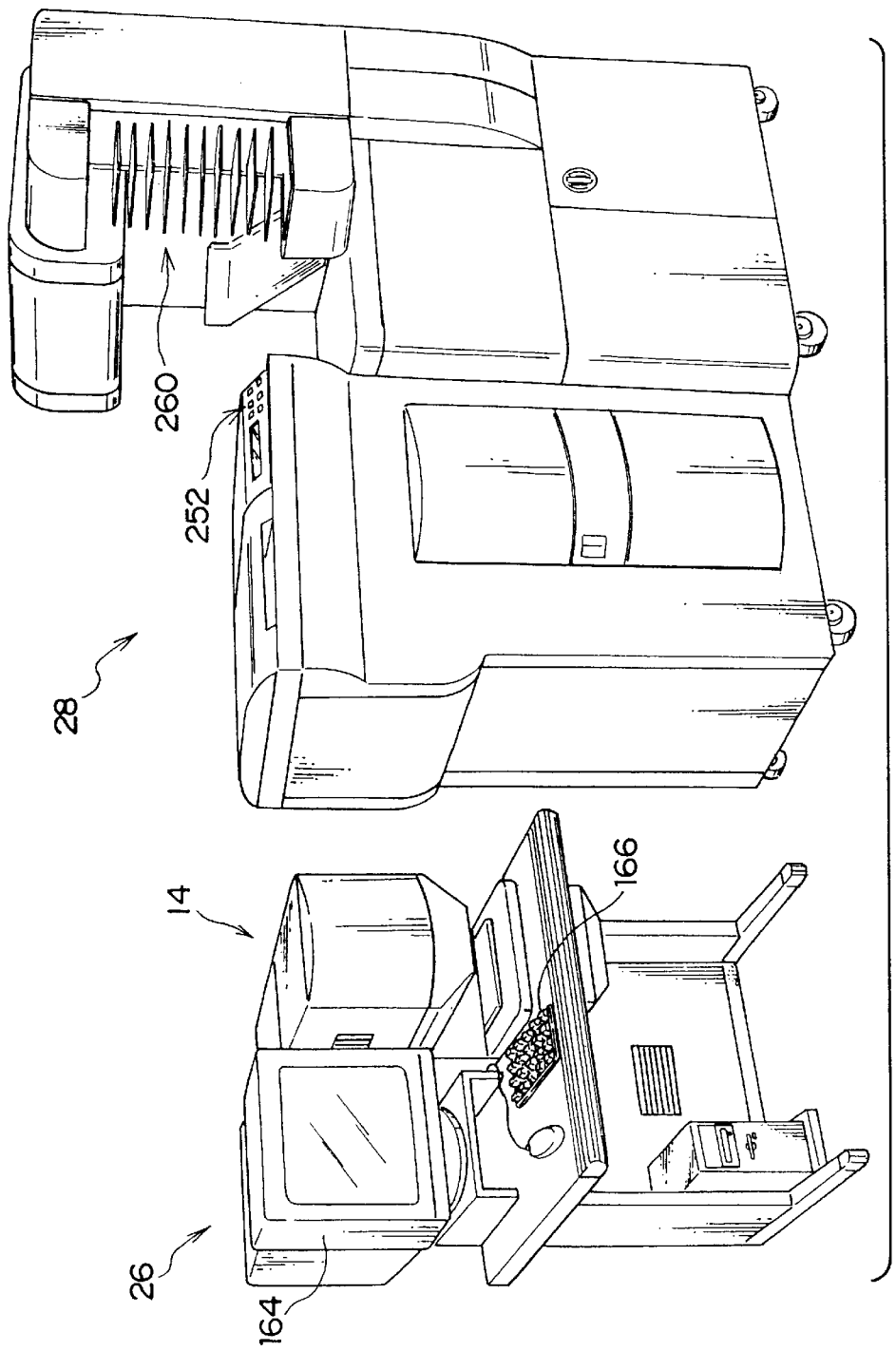
FIG. 2 is an external view of the digital laboratory system.

Overview of an Entire System:

FIG. 1 shows a schematic structure of a digital laboratory system 10 according to the embodiment of the present invention. FIG. 2 shows the exterior appearance of the digital laboratory system 10. As shown in FIG. 1, the laboratory system 10 is structured to include a line CCD scanner 14, an image processing section 16, a laser printer section 18, and a processor section 20. The line CCD scanner 14 and the image processing section 16 are integrated to form an input section 26 shown in FIG. 2 and the laser printer section 18 and the processor section 20 are integrated to form an output section 28 shown in FIG. 2. The input section 26 corresponds to an image reading apparatus according to the present invention and the line CCD scanner 14 corresponds to reading means of the present invention.

The line CCD scanner 14 is used to read a film image recorded on a photographic film such as a negative film and a reversal film. Examples of the photographic film on which a film image to be read is recorded include a photographic film in 135 magazines, a photographic film in 110 magazines, and a photographic film with a transparent magnetic layer formed thereon (i.e., a photographic film in 240 magazines: a so-called APS film), and photographic films in 120 magazines and 220 magazines (Brownie size). The line CCD scanner 14 reads the film image to be read, as described above, by a line CCD and outputs image data.

The image processing section 16 is structured to allow input of image data outputted from the line CCD scanner 14 (i.e., scan image data) and also allow input of image data obtained by photographing using a digital camera, image data obtained by reading an original other than the film image (for example, an reflection original) by a scanner, image data generated by a computer, and the like (which will be generically referred to as file image data) from the outside (for example, input of image data via a storage medium such as a memory card or input of image data from the other information processing equipment via a communication line).

The image processing section 16 effects image processing including various corrections and the like for the input image data and outputs the image data, as recording image data, to the laser printer section 18. Further, the image processing section 16 also can output the image data subjected to the image processing, as an image file, to the outside (for example, the image data can be outputted to a storage medium such as a memory card or transferred to the other information processing equipment via a communication line).

The laser printer section 18 includes laser light sources of R, G, and B and causes laser light modulated to correspond to the recording image data inputted from the image processing section 16 to be irradiated on a photographic printing paper so as to record an image on the photographic printing paper by scan exposure processing. Further, the processor section 20 effects various processes including color development, bleach-fix, washing, and drying for the photographic printing paper on which an image is recorded by scan exposure processing in the laser printer section 18. As a result, an image is formed on the photographic printing paper.

Figure 3:
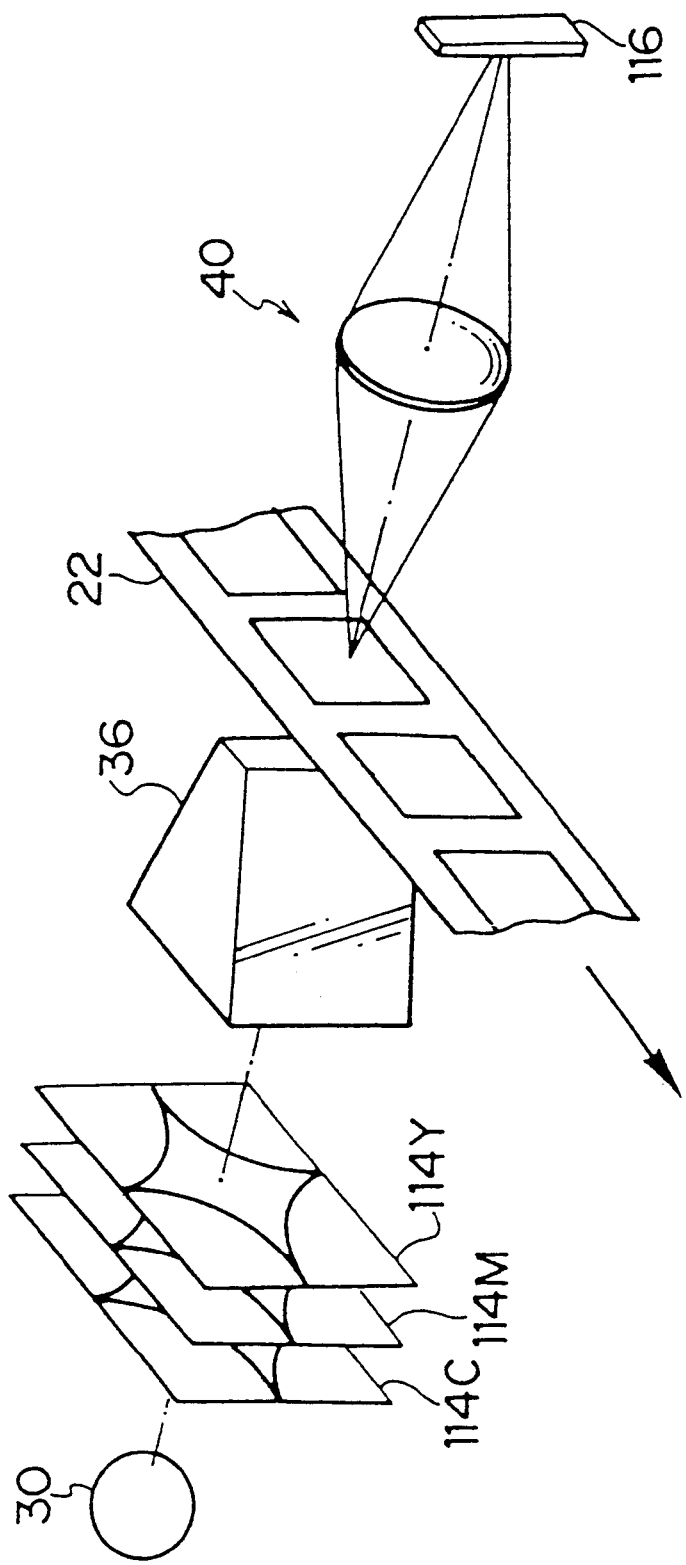
FIG. 3 is a schematic structural diagram of an optical system of a line CCD scanner.

Structure of Line CCD Scanner:

Next, a description will be given of the structure of the line CCD scanner 14. FIG. 3 shows a schematic structure of an optical system of the line CCD scanner 14. This optical system includes a light source 30 comprised of a halogen lamp or a metal halide lamp and applying light to the photographic film 22. A light diffusion box 36 by which light to be irradiated on the photographic film 22 is made into diffused light is disposed at a light emission side of the light source 30.

The photographic film 22 is conveyed by a film carrier 38 (shown in FIG. 5, but not shown in FIG. 3) disposed at a light emission side of the light diffusion box 36 such that film images sequentially pass through an optical-axis position. In FIG. 3, there is shown an elongated photographic film 22. However, a film carrier used exclusively for slide films (reversal film) which are held in a holder for a slide for each frame and a film carrier used exclusively for APS films are also provided. (The film carrier used exclusively for APS films has a magnetic head for reading magnetically recorded data which is magnetically recorded on the magnetic layer of the film.) In this way, these photographic films can also be conveyed to the optical-axis position.

Light adjusting filters 114C, 114M, and 114Y of cyan (C), magenta (M), and yellow (Y) are disposed between the light source 30 and the light diffusion box 36 sequentially along the optical axis of emitted light. A lens unit 40 which allows imaging of light transmitted through the film image and a line CCD 116 are disposed, sequentially along the optical axis, at the side of the photographic film 22 opposite to the side at which the light source 30 is disposed. Although in FIG. 3 only a single lens is shown as the lens unit 40, the lens unit 40 is actually a zoom lens formed from a plurality of lenses.

The line CCD 116 is structured in such a manner that a sensing portion, in which a large number of CCD cells and photoelectric conversion elements such as photodiode are disposed in one row and an electronic shutter mechanism is disposed, is provided in each of three lines which are parallel to each other at intervals and color separation filters of R, G, and B are respectively mounted on the light-incidence sides of the sensing portions (i.e., the line CCD 116 is a so-called three-line color CCD). The line CCD 116 is disposed in such a manner that a light receiving surface of each sensing portion coincides with the position of an imaging point of the lens unit 40. Further, a transfer portion comprised of a large number of CCD cells is provided in the vicinity of each sensing portion so as to correspond to the sensing portion. The charge accumulated in each of the CCD cells of each sensing portion is sequentially transferred via a corresponding transfer portion. Although not illustrated, a shutter is provided between the line CCD 116 and the lens unit 40.

Figure 4:
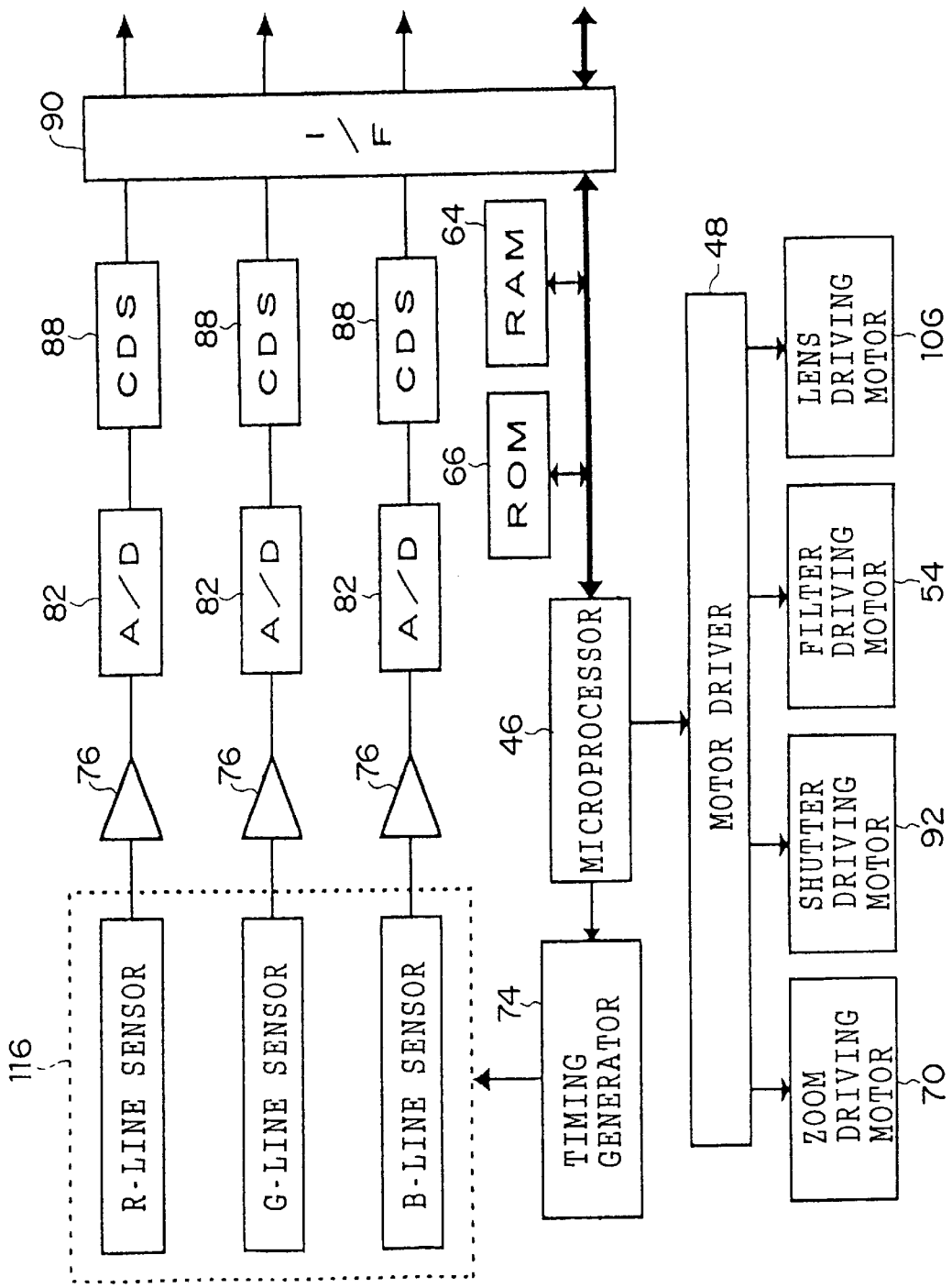
FIG. 4 is a block diagram which schematically shows the structure of an electric system of the line CCD scanner.

FIG. 4 shows a schematic structure of an electric system of the line CCD scanner 14. The line CCD scanner 14 includes a microprocessor 46 which effects control of the entire line CCD scanner 14. RAM 64 (for example, SRAM), ROM 66 (for example, ROM which can rewrite the stored content) are connected via a bus 62 to the microprocessor 46, and a motor driver 48 is also connected to the microprocessor 46. A filter driving motor 54 is connected to the motor driver 48. The filter driving motor 54 allows the light adjusting filters 114C, 114M, and 114Y to slide-move independently.

The microprocessor 46 allows the light source 30 to be turned on and off in accordance with the on-off operation of a power source switch (not shown). Further, during reading of a film image by the line CCD 116 (i.e., photometric processing), the microprocessor 46 causes the filter driving motor 54 to slidingly move the light adjusting filters 114C, 114M, and 114Y independently, so as to adjust the amount of light made incident on the line CCD 116 for each of the component color lights.

Also connected to the motor driver 48 are a zoom driving motor 70 and a lens driving motor 106. The zoom driving motor 70 varies a zoom magnification of the lens unit 40 by relatively moving the positions of the plurality of lenses of the lens unit 40. The lens driving motor 106 moves the position of an imaging point of the lens unit 40 by moving the entire lens unit 40 along the optical axis. The microprocessor 46 varies the zoom magnification of the lens unit 40 by the zoom driving motor 70 to a desired magnification in accordance with the size of the film image, in accordance with whether trimming is to be carried out, and the like.

Further, on the basis of data of a film image read by the line CCD 116, the microprocessor 46 effects focusing control to move the position of the imaging point of the lens unit 40 by the lens driving motor 106 so that the contrast of the film image is made a maximum. As a result, the position of the imaging point of the lens unit 40 is made coincident with the light receiving surface of the line CCD 116. The focusing control may also be effected based on a distance detected by a distance sensor in place of film-image data, the distance sensor being provided to measure the distance between the photographic film and the lens unit 40 (or the line CCD 116) by using infrared radiation or the like.

A timing generator 74 is connected to the line CCD 116. The timing generator 74 generates various timing signals (clock signals) for operating the line CCD 116, A/D converters 82, which will be described later, and the like. Signal output ends of the line CCD 116 are connected to the A/D converters 82 via amplifiers 76 and the signals outputted from the line CCD 116 are amplified by the amplifiers 76 and are converted to digital data in the A/D converters 82.

The output ends of the A/D converters 82 are each connected to an interface (I/F) circuit 90 via a correlated double sampling circuit (CDS) 88. The CDS 88 effects sampling of feedthrough data which indicates the level of a feed-through signal and pixel data which indicates the level of a pixel signal and subtracts the feed-through data from the pixel data for each pixel. The calculated results (pixel data which respectively correspond correctly to the amounts of charge accumulated in the CCD cells) are sequentially outputted, as scan image data, to the image processing section 16 via the I/F circuit 90.

Meanwhile, photometric signals of R, G, and B are outputted concurrently from the line CCD 116, and therefore, three signal processing systems each including the amplifiers 76, the A/D converters 82, and CDSs 88 are provided and image data of R, G, and B are concurrently outputted, as scan image data, from the I/F circuit 90.

Further, a shutter driving motor 92 which opens and closes the shutter is connected to the motor driver 48. The dark output of the line CCD 116 is corrected in an image processing section 16 at a subsequent stage, and when reading of the film image is not effected, the dark output level can be obtained by the microprocessor 46 closing the shutter.

Figure 5:
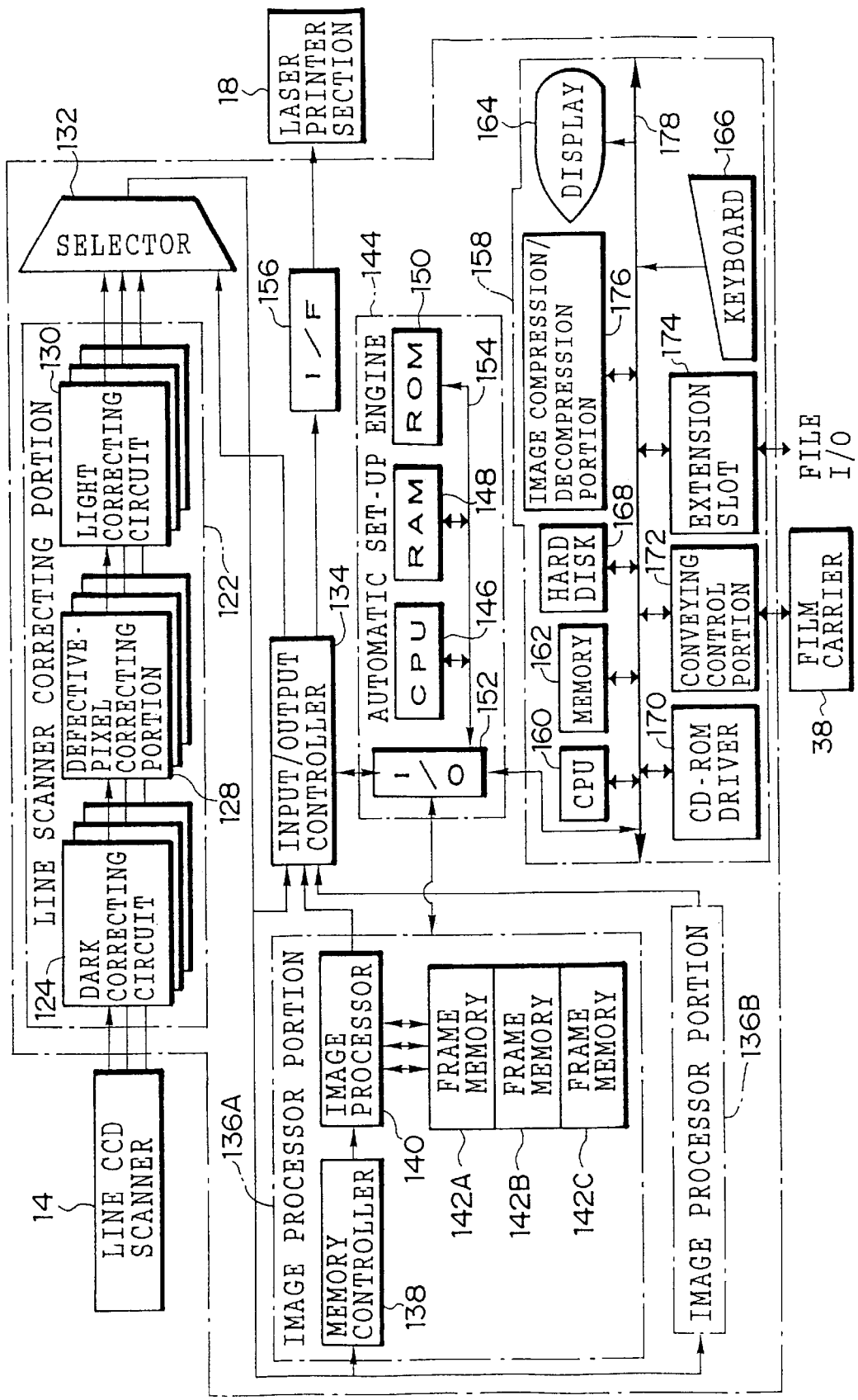
FIG. 5 is a block diagram which schematically shows the structure of an image processing section

Structure of Image Processing Section:

Next, a description will be given of the structure of the image processing section 16 with reference to FIG. 5. The image processing section 16 has a line scanner correcting portion 122 corresponding to the line CCD scanner 14. The line scanner correcting portion 122 includes three signal processing systems each having a dark correcting circuit 124, a defective-pixel correcting portion 128, and a light correcting circuit 130, correspondingly to image data of R, G, and B concurrently outputted from the line CCD scanner 14.

The dark correcting circuit 124 effects correction by storing, for each of cells, data inputted from the line CCD scanner 14 (i.e., data which represents a dark output level of each of cells of the sensing portion of the line CCD 116) in the state in which the light made incident on the line CCD 116 is cut off by the shutter and by subtracting the dark output level of a cell corresponding to each pixel from scan image data inputted from the line CCD scanner 14.

Further, the photoelectric conversion characteristic of the line CCD 116 varies for each of the cells. In the light correcting circuit 130 after the defective-pixel correcting portion 128, with an adjusting film image whose entire image surface has a constant density being set on the line CCD scanner 14, a gain is set for each of the cells based on image data of the adjusting film image inputted from the line CCD scanner 14 after the adjusting film image has been read by the line CCD 116 (the variation in density between pixels represented by the image data results from variations of the photoelectric conversion characteristics of the cells), and image data of a film image to be read inputted from the line CCD scanner 14 is corrected for each pixel in accordance with the gain set for each of the cells.

On the other hand, when the density of a specified pixel in the image data of the adjusting film image is greatly different from that of other pixels, there is some abnormality about the cell of the line CCD 116 corresponding to the specified pixel and it can be determined that the specified pixel is defective. The defective-pixel correcting portion 128 stores an address of the defective pixel based on the image data of the adjusting film image. Among the image data of the film image to be read which is inputted from the line CCD scanner 14, data of the defective pixel is interpolated by data of peripheral pixels to allow generation of new data.

Further, the line CCD 116 is formed in three lines (rows of CCD cells) which are disposed along the conveying direction of the photographic film 22 at predetermined intervals, and therefore, there is the difference in time at which output of image data of each of component colors of R, G, and B from the line CCD scanner 14 starts between these component colors. The line scanner correcting portion 122 delays the image-data output timing based on different delay times of the component colors so that image data of R, G, and B of the same pixel on the film image are outputted simultaneously.

Output ends of the line scanner correcting portion 122 are connected to input ends of a selector 132 and image data outputted from the correcting portion 122 is inputted to the selector 132. The input end of the selector 132 is also connected to a data output end of an input/output controller 134 and external-input film image data is inputted from the input/output controller 134 to the selector 132. An output end of the selector 132 is connected to each data input end of the input/output controller 134 and image processor portions 136A and 136B. The selector 132 allows the inputted image data to be selectively outputted to each of the input/output controller 134 and the image processor portions 136A and 136B.

The image processor portion 136A includes a memory controller 138, an image processor 140, and three frame memories 142A, 142B, and 142C. The frame memories 142A, 142B, and 142C each have a capacity which allows storage of image data of a film image of one frame. The image data inputted from the selector 132 is stored in any one of the three frame memories and the memory controller 138 controls an address when the image data is stored in the frame memory 142 so that the inputted image data respectively corresponding to pixels are stored in a storage region of the frame memory 142 in such a state as to be arranged in a fixed order.

The image processor 140 fetches image data stored in the frame memory 142 and effects various image processing including gradation conversion, color conversion, hypertone processing which compresses gradation of extra-low frequency luminance components of an image, hyper-sharpness processing which highlights sharpness while suppressing granularity, and the like. Meanwhile, the processing condition of the above-described image processing is automatically calculated by an automatic set-up engine 144 (which will be described later) and the image processing is effected in accordance with the calculated processing condition. The image processor 140 is connected to the input/output controller 134, and after the image data subjected to the image processing is temporarily stored in the frame memory 142, the image data is outputted to the input/output controller 134 at a predetermined timing. The image processor portion 136B has the same structure as that of the above-described image processor portion 136A, and a description thereof will be omitted.

In the present embodiment, two reading operations of different resolutions are effected for each film image in the line CCD scanner 14. In the case of the first reading operation at a relatively low resolution (which will be referred to as "pre-scan"), even when the density of a film image is extremely low (for example, even when an overexposed negative image on a negative film is used), reading of the film image is effected under a reading condition which is determined so as to prevent occurrence of saturation of accumulated charge in the line CCD 116 (the amount of light irradiated on the photographic film for each wavelength of light of the colors R, G, and B, and the time of charge accumulated in the CCD). The data obtained by the pre-scan (i.e., pre-scan image data) is inputted from the selector 132 to the input/output controller 134 and is also outputted to the automatic set-up engine 144 connected to the input/output controller 134.

The automatic set-up engine 144 includes CPU 146, RAM 148 (for example, DRAM), ROM 150 (for example, ROM which can rewrite the stored content), and an input/output port 152, which are connected together via a bus 154.

The automatic set-up engine 144 calculates, based on pre-scan image data of film images of a plurality of frames inputted from the input/output controller 134, a processing condition of the image processing for image data (fine-scan image data) obtained by the second reading operation by the line CCD scanner 14 at a relatively high resolution (which will be hereinafter referred to as "fine scan") and outputs the calculated processing condition to the image processor 140 of the image processor portion 136. In the calculation of the processing condition of the image processing, it is determined from an exposure amount during photographing, a type of a light source for photographing, and other characteristic amount, whether a plurality of film images with similar scenes photographed exists. When the plurality of film images with similar scenes photographed exists, the processing condition of image processing for fine-scan image data of these film images is determined so as to become identical or approximate.

Meanwhile, an optimum processing condition of image processing varies depending on whether image data after image processing is used for recording of an image on a photographic printing paper in the laser printer section 18 or is outputted externally. The image processing section 16 includes two image processor portions 136A, 136Bh, and therefore, for example, when image data is used for recording of an image on a photographic printing paper and is also outputted externally, the automatic set-up engine 144 calculates a processing condition most suitable for each of various purposes and outputs the calculated processing condition to the image processor portions 136A, 136B. As a result, in the image processor portions 136A, 136B, image processing is effected for the same fine-scan image data under different processing conditions.

Moreover, the automatic set-up engine 144 calculates, based on pre-scan image data of the film image inputted from the input/output controller 134, an image-recording parameter which defines gray balance when an image is recorded on a photographic printing paper in the laser printer section 18, and outputs the calculated parameter simultaneously with outputting of recording image data (described later) to the laser printer section 18. Further, the automatic set-up engine 144 calculates a processing condition for image processing for file image data inputted from the outside in the same way as the aforementioned.

The input/output controller 134 is connected via an I/F circuit 156 to the laser printer section 18. When the image data after image processing is used for recording of an image on a photographic printing paper, the image data subjected to image processing in the image processor portion 136 is outputted, as recording image data, from the input/output controller 134 to the laser printer section 18 via the I/F circuit 156. Further, the automatic set-up engine 144 is connected to a personal computer 158. When the image data subjected to image processing is outputted externally as an image file, the image data subjected to image processing in the image processor portion 136 is outputted from the input/output controller 134 to the personal computer 158 via the automatic set-up engine 144.

The personal computer 158 includes a CPU 160, a memory 162, a display 164, a keyboard 166 (also seen in FIG. 2), a hard disk 168, a CD-ROM driver 170, a conveying control portion 172, an extension slot 174, and an image compression/extension portion 176. These components are connected together via a bus 178. The conveying control portion 172 is connected to the film carrier 38 and controls conveying of the photographic film 22 effected by the film carrier 38. Further, when an APS film is set in the film carrier 38, magnetically recorded data read from the magnetic layer of the APS film by the film carrier 38 is inputted.

A driver (not shown) which effects data reading/writing for a storage medium such as a memory card, or a communication control device which communicates with other information processing equipment is connected via the extension slot 174 to the personal computer 158. When image data to be outputted externally is inputted from the input/output controller 134, the image data is outputted, as an image file, to the outside (for example, to the above-described driver or communication control device) via the extension slot 174. Further, when file image data is inputted from the outside via the extension slot 174, the inputted file image data is outputted to the input/output controller 134 via the automatic set-up engine 144. In this case, the input/output controller 134 outputs the inputted file image data to the selector 132.

Figure 6:
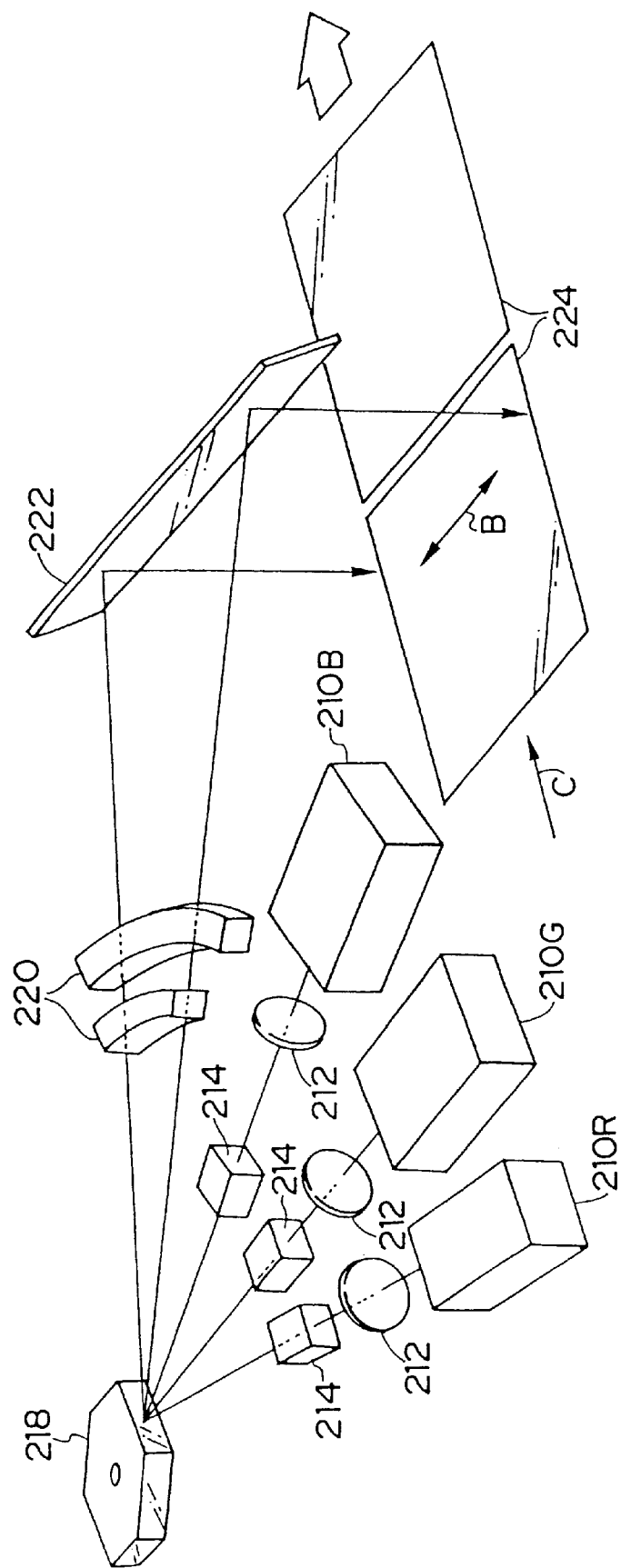
FIG. 6 is a schematic structural diagram of an optical system of a laser printer section.

Meanwhile, when the pre-scan image data or the like is outputted to the personal computer 158, a film image read by the line CCD scanner 14 is shown on the display 164 or an image obtained by being recorded on the photographic printing paper is estimated and shown on the display 164, and an instruction for correction of the image, or the like is given by an operator via the keyboard 166, the image processing section 16 also allows the correction of an image to be reflected in the processing condition for image processing. Structures of laser printer section and processor section:

Next, a description will be given of the laser printer section 18 and the processor section 20. FIG. 6 shows the structure of an optical system of the laser printer section 18. The laser printer section 18 includes three laser light sources 210R, 210G, and 210B. The laser light source 210R is formed from a semiconductor laser (LD) which emits laser light having a wavelength of R. The laser light source 210G is formed from an LD and a wavelength conversion element (SHG) which converts laser light emitted from the LD to laser light whose wavelength is a half thereof and an oscillation wavelength of the LD is determined so that laser light having a wavelength of G is emitted from the SHG. Similarly, the laser light source 210B is also formed from the LD and SHG and the oscillation wavelength of the LD is determined so that laser light having a wavelength of B is emitted from the SHG.

A collimator lens 212 and an acoustooptic light modulation element (AOM) 214 are sequentially disposed at a laser light exit side of each of the laser light sources 210R, 210G, and 210B. Each AOM 214 is disposed so as to allow incident laser light to be transmitted through an acoustooptic medium and is also connected to an AOM driver 216 (see FIG. 7). When a high-frequency signal is inputted from the AOM driver 216, an ultrasonic wave corresponding to the high-frequency signal is propagated through the acoustooptic medium and an acoustooptic effect acts on laser light transmitted through the acoustooptic medium to cause diffraction. As a result, laser light having an intensity corresponding to the amplitude of the high-frequency signal is emitted, as diffracted light, from each AOM 214.

A polygon mirror 218 is disposed at the side where diffracted light is emitted from each AOM 214. Three laser light beams each having wavelengths of R, G, and B, which are emitted as diffracted light from the AOMs 214, are irradiated on the reflecting surface of the polygon mirror 218 substantially at the same position and are further reflected by the polygon mirror 218. An fθ lens 220 and a plane mirror 222 are disposed at the side where laser light is emitted from the polygon mirror 218 and the three laser light beams reflected by the polygon mirror 218 are transmitted through the fθ lens 220, reflected by the plane mirror 222, and is then irradiated on the photographic printing paper 224.

Figure 7:
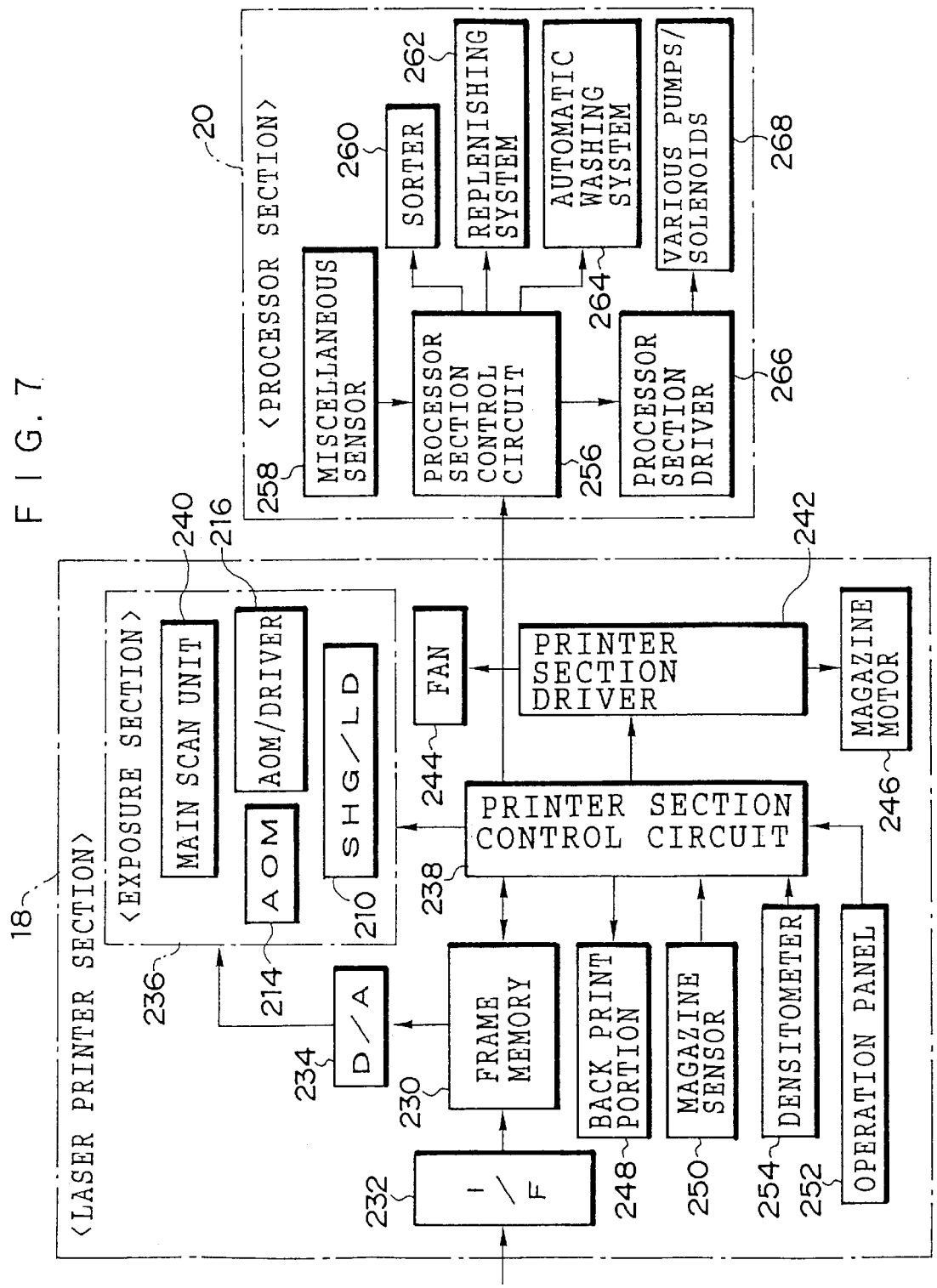
FIG. 7 is a block diagram which schematically shows the structure of the electric system of the laser printer section and the structure of the electric system of a processor section.

FIG. 7 schematically shows the structures of electric systems of the laser printer section 18 and the processor section 20. The laser printer section 18 includes a frame memory 230 which stores image data. The frame memory 230 is connected via an I/F circuit 232 to the image processing section 16 and recording image data inputted from the image processing section 16 (i.e., image data which represent densities of R, G, and B for each of pixels of an image to be recorded on the photographic printing paper 224) are temporarily stored in the frame memory 230 via the I/F circuit 232. The frame memory 230 is connected via an D/A converter 234 to an exposure section 236 and is also connected to a printer-section control circuit 238.

The exposure section 236 includes, as described above, three laser light sources 210 each formed from the LD (and the SHG) and three systems each including AOM 214 and AOM driver 216, and also includes the polygon mirror 218 and a main-scan unit 240 having a motor for rotating the polygon mirror 218. The exposure section 236 is connected to the printer-section control circuit 238 and the operation of each portion thereof is controlled by the printer-section control circuit 238.

In order that an image represented by image data for recording is recorded on the photographic printing paper 224 by scan and exposure, the printer-section control circuit 238 effects, based on an image-recording parameter inputted from the image processing section 16, various corrections for the recording image data to prepare image data for scan and exposure and stores the prepared image data in the frame memory 230. Subsequently, the polygon mirror 218 of the exposure section 236 is rotated and laser light is emitted from each of the laser light sources 210R, 210G, and 210B, and further, the prepared image data for scan and exposure is outputted from the frame memory 230 to the exposure section 236 via the D/A converter 234. As a result, the image data for scan and exposure is converted to an analog signal and is further inputted to the exposure section 236.

The AOM driver 216 varies the amplitude of an ultrasonic signal supplied for the AOM 214 in accordance with the level of the inputted analog signal and modulates the intensity of laser light emitted as diffracted light from the AOM 214 in accordance with the level of the analog signal (i.e., any one of densities of R, G, and B of each pixel of an image to be recorded on the photographic printing paper 224). Accordingly, laser light beams of R, G, and B, of which intensity is modulated in accordance with the densities of R, G, and B of the image to be recorded on the photographic printing paper 224 are emitted from the three AOMs 214 and these laser light beams are irradiated together on the photographic printing paper 224 via the polygon mirror 218, the fθ lens 220, and the mirror 222.

The main scan is effected in such a manner that the position where each laser light beam is irradiated is scanned along the direction indicated by arrow B in FIG. 6 accompanied with the rotation of the polygon mirror 218 and sub-scan of laser light is effected in such a manner that the photographic printing paper 224 is conveyed at constant speed along the direction indicated by arrow C in FIG. 6, and therefore, an image is recorded on the photographic printing paper 224 by scan and exposure. The photographic printing paper 224 on which the image has been recorded by scan and exposure is transferred to the processor section 20.

A printer-section driver 242 is connected to the printer-section control circuit 238. Connected to the printer-section driver 242 are a fan 244 and a magazine motor 246. The fan 244 blows air against the exposure section 236 and the magazine motor 246 is used to pull out the photographic printing paper accommodated in a magazine mounted in the laser printer section. Further, connected to the printer-section control circuit 238 is a back print portion 248 in which characters and the like are printed onto the rear surface of the photographic printing paper 224. Each operation of the fan 244, the magazine motor 246, and the back print portion 248 is controlled by the printer-section control circuit 238.

Further, also connected to the printer-section control circuit 238 are a magazine sensor 250, an operation panel 252 (also seen in FIG. 2), a densitometer 254, and a processor-section control circuit 256 of the process section 20. The magazine sensor 250 detects a mounted/detached state of the magazine in which an unexposed photographic printing paper 224 is accommodated and the size of the photographic printing paper accommodated in the magazine, the operation panel 252 is used by an operator to input various instructions, the densitometer 254 measures the density of an image visualized after the image has been subjected to development and the like in the processor section 20.

Connected to the processor-section control circuit 256 is a miscellaneous sensor 258 which detects passing of the photographic printing paper 224 conveyed on the conveying path within the machine body of the processor section 20 and the liquid-surface position of each of various processing solutions filled in a processing tank, and the like.

Further, connected to the processor-section control circuit 256 are a sorter 260 (also seen in FIG. 2), a replenishing system 262, and an automatic washing system 264. The sorter 260 is used to sort, every predetermined group, photographic printing papers subjected to development processing and the like and discharged from the machine body, the replenishing system 262 is used to replenish the processing tank of the replenishing solution, and the automatic washing system 264 allows washing of rollers and the like. Further, a miscellaneous pump/solenoid 268 is connected via a processor-section driver 266 to the processor-section control circuit 256. Each operation of the sorter 260, the replenishing system 262, the automatic washing system 264, and the miscellaneous pump/solenoid 268 is controlled by the processor-section control circuit 256.

Figure 8:
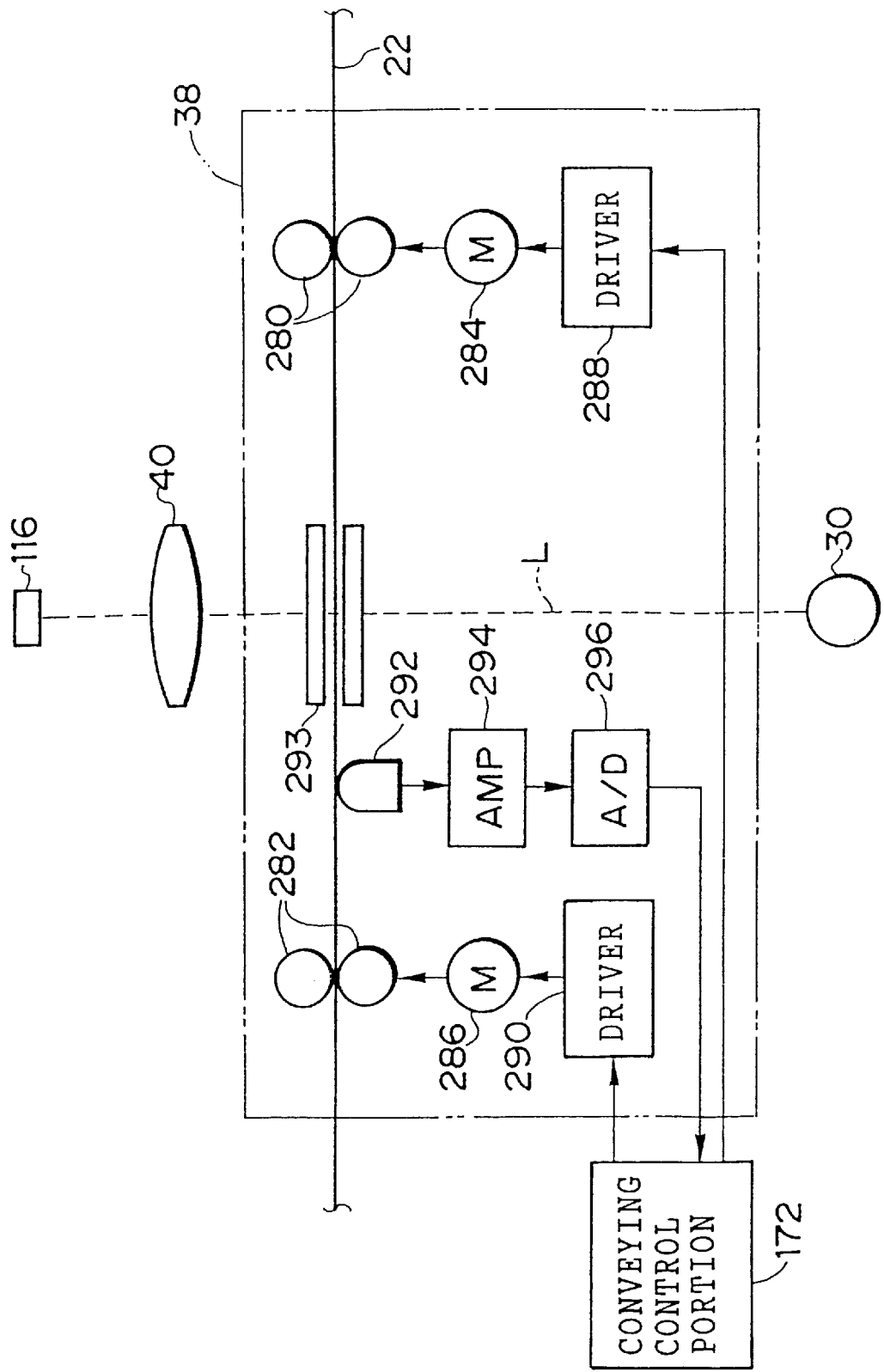
FIG. 8 is a schematic structural diagram of a film carrier.

Structure of Film Carrier:

Next, a description will be given of the structure of the film carrier 38 for the APS film with reference to FIG. 8. FIG. 8 shows the state in which the film carrier 38 is set in the line CCD scanner 14. (In FIG. 8, the light adjusting filters 114C, 114M, and 114Y, the light diffusion box 36, and the like are not illustrated.)

The film carrier 38 includes conveying roller pairs 280 and 282 which are disposed at respective sides of an optical axis L of light emitted from the light source 30 with the optical axis L as the center. The conveying roller pairs 280 and 282 are rotated due to driving force of the motors 284 and 286 being transmitted thereto, and as the conveying roller pairs 280 and 282 rotate, the photographic film 22 nipped by the conveying roller pairs 280 and 282 is conveyed across the optical axis L. The motors 284 and 286 are connected to the conveying control portion 172 via drivers 288 and 290, respectively. Disposed at the position where the conveying path of the photographic film 22 crosses the optical axis L is a mask 293 which blocks light emitted from the light source 30 and transmitted through regions other than the image recording range of the photographic film 22 and which can vary the range over which light is blocked off.

A magnetic head 292 used for reading magnetically recorded data which is magnetically recorded on a magnetic layer of the photographic film 22 (i.e., the APS film) is disposed close to the conveying path of the photographic film 22. The magnetically recorded data represents a photographing condition at the time of photographing or the like, and includes data such as the photographing time, the amount of exposure at the time of photographing, the type of light source used for photographing, whether the image is a photographed backlit scene, and the like. The magnetically recorded data read by the magnetic head 292 is amplified by an amplifier (AMP) 294 to a predetermined level and converted to digital data by the A/D converter 296, and further, is inputted to the conveying control portion 172.

The magnetic head 292 corresponds to the magnetically recorded data-reading means of the present invention, and the film carrier 38 and the conveying control portion 172 each correspond to the conveying means of the present invention.

Figure 9:
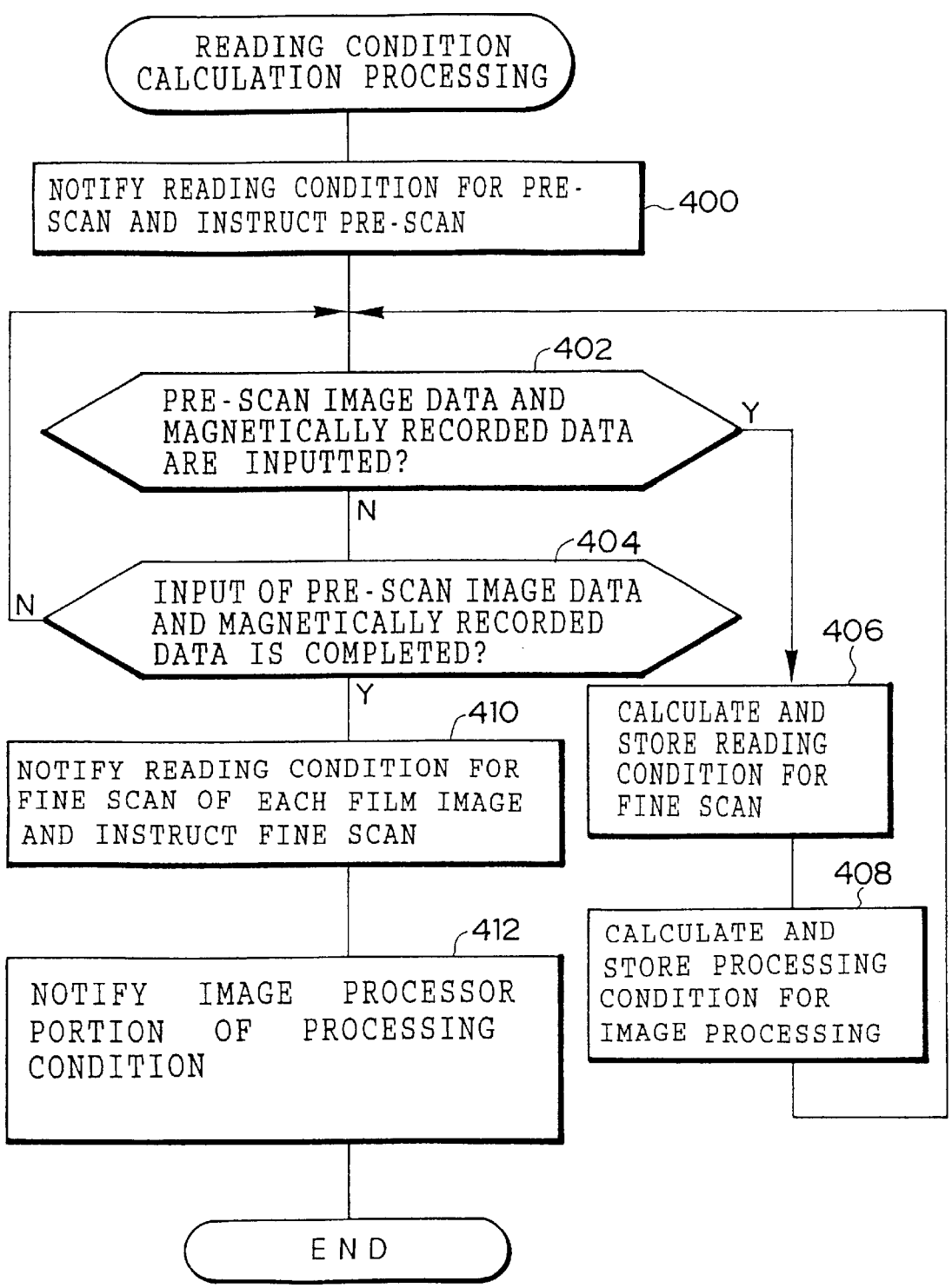
FIG. 9 is a flow chart which shows the details of reading condition calculation processing.
Figure 10:
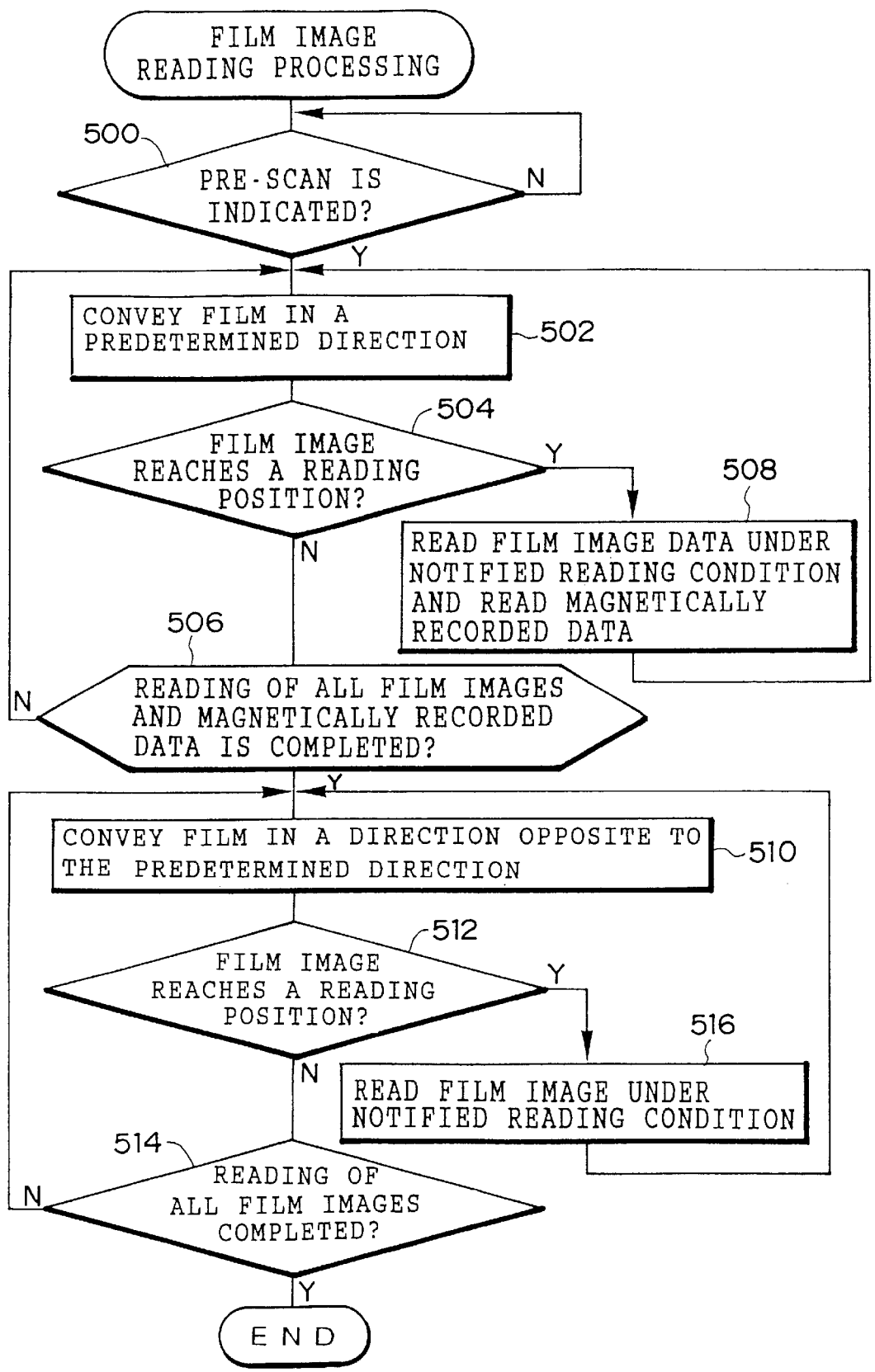
FIG. 10 is a flow chart which shows the details of film image reading processing.

Operation:

As the operation of the image reading apparatus according to the embodiment of the present invention, description will be given of reading condition calculation processing (see FIG. 9), which is executed by the automatic set-up engine 144 of the image processing section 16 when a film image recorded on the photographic film 22 is read, and film image reading processing (see FIG. 10) executed by the conveying control portion 172. There will be hereinafter described a case in which a film image recorded on the APS film serving as the photographic film 22 is read and the reading of the film image is effected by the line CCD scanner 14 in which the film carrier 38 is set. The automatic set-up engine 144 and the conveying control portion 172 each correspond to the control means of the present invention.

In the reading condition calculation processing, first, in step 400, a predetermined reading condition during pre-scan of a film image is notified to the line CCD scanner 14, and an instruction to execute of pre-scan of the film image recorded on the photographic film 22 is given to the line CCD scanner 14 and the conveying control portion 172. In step 402, it is determined whether pre-scan image data and magnetically recorded data magnetically recorded on the magnetic layer of the photographic film 22 have been inputted. When the determination in step 402 is negative, the process proceeds to step 404, where it is determined whether pre-scan image data and the magnetically recorded data of all of the film images recorded on one roll of photographic film have been inputted. When the determination in step 404 is also negative, the process returns to step 402, and steps 402 and 404 are repeated.

On the other hand, in the film image reading processing, first, in step 500, it is determined whether execution of pre-scan has been indicated, and the process is placed in a stand-by state until the decision of step 500 becomes affirmative. When execution of pre-scan is indicated, the determination in step 500 becomes affirmative. In subsequent step 502, as also shown in FIG. 11, the film carrier 38 conveys the photographic film 22 in a predetermined direction (which will be hereinafter referred to as the forward direction) at a fixed conveying speed suitable for pre-scan and reading of magnetically recorded data.

In step 504, it is determined whether a film image has arrived at the position where a film image is read by the line CCD 116. When the determination in step 504 is negative, the process proceeds to step 506, where it is determined whether reading of all of the film images recorded on one roll of photographic film and magnetically recorded data which represents photographing conditions at the time of photographing, and the like has been effected. When the determination in step 506 is negative, the process returns to step 502, and steps 502 to 506 are repeated. When the determination in step 504 becomes affirmative in step 508, the film image is read by the line CCD 116 o f the line CCD scanner 14 in accordance with the reading condition for pre-scan which was notified from the automatic set-up engine 144, and simultaneously, the magnetically recorded data which is magnetically recorded on the magnetic layer of the photographic film 22 is also read. The image data obtained by the above reading is outputted, as pre-scan image data, to the image processing section 16 together with the magnetically recorded data.

When the above-described step 508 is repeated each time a film image arrives at the position where a film image is to be read by the line CCD 116, film images are read sequentially from a leading side of the photographic film in the forward direction (in the order of frame numbers 1,2, . . . , n, assuming that frame numbers 1,2, . . . , n are respectively given to film images sequentially from the leading side in the forward direction), and the magnetically recorded data recorded in correspondence with each film image is also read. The image data (pre-scan image data) obtained by the above reading and the magnetically recorded data are sequentially outputted to the image processing section 16.

As the reading condition at the pre-scan, a standard reading condition is used which is set such that the majority of the film images (film images whose densities fall in a predetermined range) can be read accurately and such that no saturation of charge accumulated in the line CCD 116 occurs even when a film image having a low density is read.

In the reading condition calculation processing (see FIG. 9), when pre-scan image data and magnetically recorded data are inputted, the determination in step 402 becomes affirmative, and the process proceeds to step 406 where based on the inputted pre-scan image data and magnetically recorded data which represents a photographing condition at the time of photographing or the like, a reading condition for carrying out fine scan of the same film image is calculated on the basis of a characteristic amount such as an average density of a film image and is stored in the RAM 148 or the like in correspondence with the frame number.

In subsequent step 408, an amount of exposure of a film image at the time of photographing, a type of light source used for photographing, and other characteristic amounts are determined based on the inputted pre-scan image data and magnetically recorded data which represents a photographing condition at the time of photographing or the like. Based on the obtained characteristic amounts, a processing condition of image processing for fine scan image data obtained by carrying out fine scan on the same film image is calculated, and the calculated processing condition is stored in the RAM 148 in correspondence with the frame number, and thereafter, the process returns to step 402.

When the determination in step 404 is affirmative, i.e., when it is determined that pre-scan image data and the magnetically recorded data which represents photographing conditions and the like of all of the film images recorded on one roll of photographic film 22 have been inputted, the process proceeds to step 410, where the reading conditions at fine scan for each film image, which is calculated and stored in the RAM 148, is notified to the line CCD scanner 14, and an instruction to execute of fine scan is given to the line CCD scanner 14 and the conveying control portion 172. Further, in subsequent step 412, the processing conditions of image processing for fine scan image data of each film image, which has been calculated and stored in the RAM 148, is notified to the image processor 140 of the image processor portion 136.

On the other hand, in the film image reading processing (see FIG. 10), when reading of all of the film images is completed, the decision of step 506 is affirmative, and the process proceeds to step 510 where the photographic film 22 is conveyed by the film carrier 38 at a fixed conveying speed in a direction opposite to the predetermined direction (i.e., the photographic film 22 is conveyed in the reverse direction).

In step 512, it is determined whether a film image has arrived at the position where a film image is to be read by the line CCD 116. When the determination in step 512 is negative, the process proceeds to step 514 in which it is determined whether reading of all of the film images recorded on one roll of photographic film has been carried out. When the determination in step 514 is also negative, the process returns to step 510 and steps 510 to 514 are repeated. When the determination in step 512 is affirmative, the process proceeds to step 516 where the film image is read by the line CCD 116 in accordance with the reading condition for fine scan notified from the automatic set-up engine 144, and the image data obtained by the above reading is outputted, as fine scan image data, to the image processing section 16.

Accordingly, in the present embodiment, as shown in FIG. 11, immediately after pre-scan of all film of the images has been completed, the film images are read by the line CCD 116 in accordance with the notified reading condition for fine scan sequentially from the final end in the forward direction (in the order of frame numbers n, n−1, . . . , 1), and the obtained image data is outputted, as fine scan image data, to the image processing section 16. In the image processor portion 136, the fine scan image data of each film image inputted from the line CCD scanner 14 to the image processing section 16 is subjected to image processing according to the processing condition calculated for that film image in the automatic set-up engine 144, and is then outputted.

In the image reading apparatus according to the embodiment of the present invention, preliminary reading of a film image and reading of magnetically recorded data are effected concurrently during one film conveying operation, and therefore, the number of times a film must be conveyed in order to read a film image can be reduced, and wear of a magnetic head for reading magnetically recorded data and damage to the film, which accompany the conveying of the film, can be prevented.

The conveying speed of the APS film suitable for magnetic recording of data onto a magnetic layer of the APS film has a relatively high degree of freedom. Accordingly, for example, data such as the reading condition for fine scan calculated in step 406, the processing condition for image processing of fine scan image data calculated in step 408, and the like may be magnetically recorded on the magnetic layer of the photographic film 22 (i.e., the APS film) concurrently with the fine scan when the fine scan is effected while the photographic film 22 is conveyed in the reverse direction. As a result, when the film image recorded on the APS film is read again in order to be recorded on a recording material at a later date, fine scan and image processing of the fine scan image data can be effected under the same conditions as those of the previous processing.

What is claimed is:

1. An image reading apparatus in which a preliminary reading is carried out of a film image recorded on an elongated photographic film, and a main reading condition for main reading of the film image is determined based on results of the preliminary reading, and main reading of the film image is carried out under the main reading condition, comprising:

a film image reading section which reads the film image recorded on the photographic film;

a magnetically recorded data reading section which reads first magnetically recorded data which is magnetically recorded on a magnetic recording layer of the photographic film;

a conveyor which conveys the photographic film; and a controller for controlling said film image reading section to carry out the preliminary reading of each of film images recorded on the photographic film while controlling said conveyor to convey the photographic film in a predetermined direction, and for controlling said magnetically recorded data reading section to read the first magnetically recorded data concurrently with the preliminary reading of the film images by said film image reading section.

2. An image reading apparatus according to claim 1, wherein said film image reading section is a scanner using a line image sensor.

3. An image reading apparatus according to claim 1, wherein the preliminary reading and the reading of the first magnetically recorded data are carried out when the photographic film is conveyed by said conveyor in a forward direction, and the main reading is carried out when the photographic film is conveyed by said conveyor in a reverse direction.

4. An image reading apparatus according to claim 1, further comprising:

a magnetically recorded data writing section which writes second magnetically recorded data on a magnetic recording layer of the photographic film.

5. An image reading apparatus according to claim 4, wherein the second magnetically recorded data is at least one of the main reading condition and a processing condition for image data obtained by the main reading.

6. An image reading apparatus according to claim 4, wherein writing of the second magnetically recorded data is carried out when the photographic film is conveyed by said conveyor in the reverse direction.

7. An image reading method in which a preliminary reading is carried out of a film image recorded on an elongated photographic film, and a main reading condition for main reading of the film image is determined based on results of the preliminary reading, and main reading of the film image is carried out under the main reading condition, comprising the steps of:

performing a preliminary reading of the film image recorded on the photographic film; and reading first magnetically recorded data which is magnetically recorded on a magnetic recording layer of the photographic film, wherein the preliminary reading of the film image and the reading of the first magnetically recorded data are carried out concurrently while the photographic film is being conveyed by a conveyor in a predetermined direction.

8. An image reading method according to claim 7, wherein the preliminary reading of the film image recorded on the photographic film is carried out by a scanner using a line image sensor.

9. An image reading method according to claim 7, wherein the preliminary reading and the reading of the first magnetically recorded data are carried out when the photographic film is conveyed by said conveyor in a forward direction, and the main reading is carried out when the photographic film is conveyed by said conveyor in a reverse direction.

10. An image reading method according to claim 7, further comprising the step of:

writing second magnetically recorded data on a magnetic recording layer of the photographic film.

11. An image reading method according to claim 10, wherein the second magnetically recorded data is at least one of the main reading condition and a processing condition for image data obtained by the main reading.

12. An image reading method according to claim 10, wherein writing of the second magnetically recorded data is carried out when the photographic film is conveyed by said conveyor in the reverse direction.

13. An image reading apparatus in which a preliminary reading is carried out of a film image recorded on an elongated photographic film, and based on a result of the preliminary reading, a main reading condition for main reading of the film image is determined, and a main reading of the film image is carried out under the main reading condition, comprising:

a film image reading section which reads the film image recorded on the photographic film;

a magnetically recorded data reading section which reads first magnetically recorded data which is magnetically recorded on a magnetic recording layer of the photographic film;

a conveying section which conveys the photographic film; and a control section which controls said film image reading section and said magnetically recorded data reading section such that the preliminary reading of each of film images recorded on the photographic film and reading of the first magnetically recorded data are carried out concurrently at one film conveying operation in which the photographic film is conveyed in a predetermined direction.

* * * * *